(12) United States Patent
Wanderman et al.

(10) Patent No.: US 8,879,249 B1
(45) Date of Patent: Nov. 4, 2014

(54) REINFORCED ENCLOSURE

(71) Applicant: Google Inc., Mountain View, CA (US)

(72) Inventors: Jack Joseph Wanderman, Minnetonka, MN (US); Jeffrey Hayashida, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/730,785

(22) Filed: Dec. 28, 2012

(51) Int. Cl.
*G06F 1/16* (2006.01)
*H01S 4/00* (2006.01)
*B29C 45/00* (2006.01)

(52) U.S. Cl.
CPC .......... *G06F 1/1601* (2013.01); *B29C 45/0005* (2013.01)
USPC ..................... 361/679.55; 29/592.1

(58) Field of Classification Search
CPC .......................... B29C 45/0005; G06F 1/1601
See application file for complete search history.

(56) References Cited

U.S. PATENT DOCUMENTS

| | | | | |
|---|---|---|---|---|
| 3,112,221 | A * | 11/1963 | Price | 442/68 |
| 3,230,375 | A * | 1/1966 | Van Wagoner et al. | 250/517.1 |
| 4,831,210 | A * | 5/1989 | Larson et al. | 174/386 |
| 4,896,001 | A * | 1/1990 | Pitts et al. | 174/394 |
| 5,164,542 | A * | 11/1992 | Hart | 174/383 |
| 5,329,427 | A * | 7/1994 | Hogdahl | 361/730 |
| D353,133 | S * | 12/1994 | Yamada et al. | D14/325 |
| 6,498,719 | B1 * | 12/2002 | Bridges | 361/679.34 |
| 6,765,790 | B2 * | 7/2004 | Lam et al. | 361/679.55 |
| 6,768,654 | B2 * | 7/2004 | Arnold et al. | 361/818 |
| 7,080,787 | B2 * | 7/2006 | Wulff et al. | 235/462.45 |
| 7,232,960 | B2 * | 6/2007 | Matsumoto et al. | 174/544 |
| 7,382,607 | B2 * | 6/2008 | Skillman | 361/679.55 |
| 7,535,698 | B2 * | 5/2009 | Iwamoto et al. | 361/679.55 |
| 7,586,739 | B2 * | 9/2009 | Weksler et al. | 361/679.26 |
| 7,894,181 | B2 * | 2/2011 | Iwamoto et al. | 361/679.21 |
| 8,432,672 | B2 * | 4/2013 | Cho et al. | 361/679.21 |
| 8,618,415 | B2 * | 12/2013 | Wennemer et al. | 174/50 |
| 2002/0126445 | A1 * | 9/2002 | Minaguchi et al. | 361/683 |
| 2006/0061512 | A1 * | 3/2006 | Asano et al. | 343/702 |
| 2007/0041149 | A1 * | 2/2007 | Homer et al. | 361/681 |
| 2008/0049949 | A1 * | 2/2008 | Snider et al. | 381/86 |
| 2008/0128318 | A1 * | 6/2008 | Kokinda | 206/701 |
| 2009/0045195 | A1 * | 2/2009 | Djerf et al. | 220/62.11 |
| 2009/0047453 | A1 * | 2/2009 | Folaron et al. | 428/34.1 |
| 2010/0238621 | A1 * | 9/2010 | Tracy et al. | 361/679.27 |
| 2013/0107434 | A1 * | 5/2013 | Lynch et al. | 361/679.01 |

* cited by examiner

*Primary Examiner* — Adrian S Wilson

(74) *Attorney, Agent, or Firm* — Brake Hughes Bellermann LLP

(57) ABSTRACT

In accordance with aspects of the disclosure, a device may include a base member formed as a receptacle with a recess defining an interior region configured for receiving internal circuitry. The base member may include first and second sides intersecting orthogonally to define a corner. The device may include a rail member having a first portion coupled to the first side of the base member and a second portion coupled to the second side of the base member. The rail member may be positioned to contact the corner of the base member. The device may include an enclosing member coupled to the first and second portions of the rail member with a plurality of fasteners to thereby enclose the internal circuitry disposed in the recess of the base member between the enclosing member and the base member.

20 Claims, 12 Drawing Sheets

REINFORCED ENCLOSURE

TECHNICAL FIELD

The disclosure relates to reinforced enclosures for computing devices.

BACKGROUND

In recent trends, portable computing devices are becoming thinner due in part to user demand. Conventional computer housings having thin profiles are typically made of injection molded materials that may limit the use of alternative fabrication techniques for increasing, decreasing, or varying stiffness. For instance, as laptop form factors become thinner, it may be beneficial to preserve structural stiffness in particular regions of shell housings to improve device resiliency against damage, while reducing structural stiffness in other regions of the shell housings. Further, it may be beneficial to uniformly increase structural stiffness of shell housings, while maintaining thin wall form factors of laptops. Unfortunately, conventional computer enclosures are increasingly inadequate due to their essentially thin shell housings without any internal mechanism for varying stiffness at particular regions across the shell housings. As such, there exists a need to improve integrity and resiliency of computer housings by varying strength and stiffness of these computer housings.

SUMMARY

In accordance with aspects of the disclosure, a device may include an enclosure configured for retaining internal circuitry including at least one processor and at least one memory. The enclosure may include an internal frame formed as an array of structural members arranged in a pattern. The internal frame may include fibers applied to the pattern of the structural members. The internal frame may include an outer shell formed by injecting a material into a mold to thereby encase the internal frame in the material. The material may be injected into the mold around the fibers applied to the pattern of the structural members. The enclosure may include a user interface coupled to the enclosure. The user interface may be configured to communicate with the internal circuitry retained by the enclosure.

In accordance with aspects of the disclosure, a method may be provided for assembling a computing device. The method may include forming an enclosure for the computing device. The enclosure may be configured for retaining internal circuitry including at least one processor and at least one memory. Forming the enclosure may include forming an internal frame of the enclosure as an array of structural members arranged in a pattern, applying fibers to the internal frame by applying the fibers to the pattern of the structural members, and forming an outer shell of the enclosure by injecting a material into a mold to thereby encase the internal frame in the material. The material may be injected into the mold around the fibers applied to the pattern of the structural members. The method may include coupling a user interface to the enclosure, the user interface configured to communicate with the internal circuitry retained by the enclosure.

In accordance with aspects of the disclosure, an apparatus may include internal circuitry including at least one processor and at least one memory and an enclosure configured to retain the internal circuitry. The enclosure may be fabricated by forming an internal frame for the enclosure as an array of intersecting cylindrical structural members arranged in a grid pattern resembling a waffle. The enclosure may be fabricated by applying high-tensile strength fibers to the internal frame by disposing the high-tensile strength fibers into contact with the structural members. The enclosure may be fabricated by forming an outer shell of the enclosure by injecting a plastic material into a mold to thereby encase the internal frame in the plastic material, and the plastic material may be injected into the mold around the high-tensile strength fibers weaved into and wound around the structural members of the internal frame. The apparatus may include a user interface coupled to the enclosure. The user interface may be configured to communicate with the internal circuitry retained by the enclosure.

The details of one or more implementations are set forth in the accompanying drawings and the description below. Other features will be apparent from the description and drawings, and from the claims.

BRIEF DESCRIPTION OF THE DRAWINGS

FIGS. 3B-1, 3B-2, 3B-3, and 3B-4 are diagrams illustrating various profile views of the structural members of the internal frame and the reinforcing fibers, in accordance with aspects of the disclosure.

DETAILED DESCRIPTION

In accordance with aspects of the disclosure, reinforcement of enclosures for computing devices (e.g., portable laptop enclosures, tablet enclosures, mobile phone enclosures, etc.) may be increased with mechanical reinforcing materials. For instance, a miniaturized rebar architectural structure with applied reinforcing fibers (e.g., weaving and/or winding fibers within and around internal structural structural members) may be implemented to increase stiffness and rigidity of device enclosures. For example, fibers may be applied to (e.g., disposed on, coupled to, weaved into, and/or wound around) an internal frame (e.g., the frame may be a matrix or grid pattern of structural members crossing over each other to form a pattern), and within a mold, a material may be injected around the fibers and the frame to form the enclosure. In this example, the enclosure may be formed by injecting the plastic material into the mold to encase the internal frame with the applied fibers in the material. In other various examples, the internal frame may include an irregular or random arrangement of structural members crossing over each other with the fibers disposed on (e.g., weaved into and/or wound around) the irregularly or randomly arranged structural members.

Further, aspects of the disclosure may provide various benefits including, for instance, preserving structural stiffness in particular regions of computing device enclosures to improve resiliency against damage, while reducing structural stiffness in other regions of the computing device enclosures. In another instance, other benefits may include uniformly increasing structural stiffness of computing device enclosures, while maintaining thin wall form factors of the computing device enclosures. These and other aspects of the disclosure are described in greater detail herein.

Figure 1A:
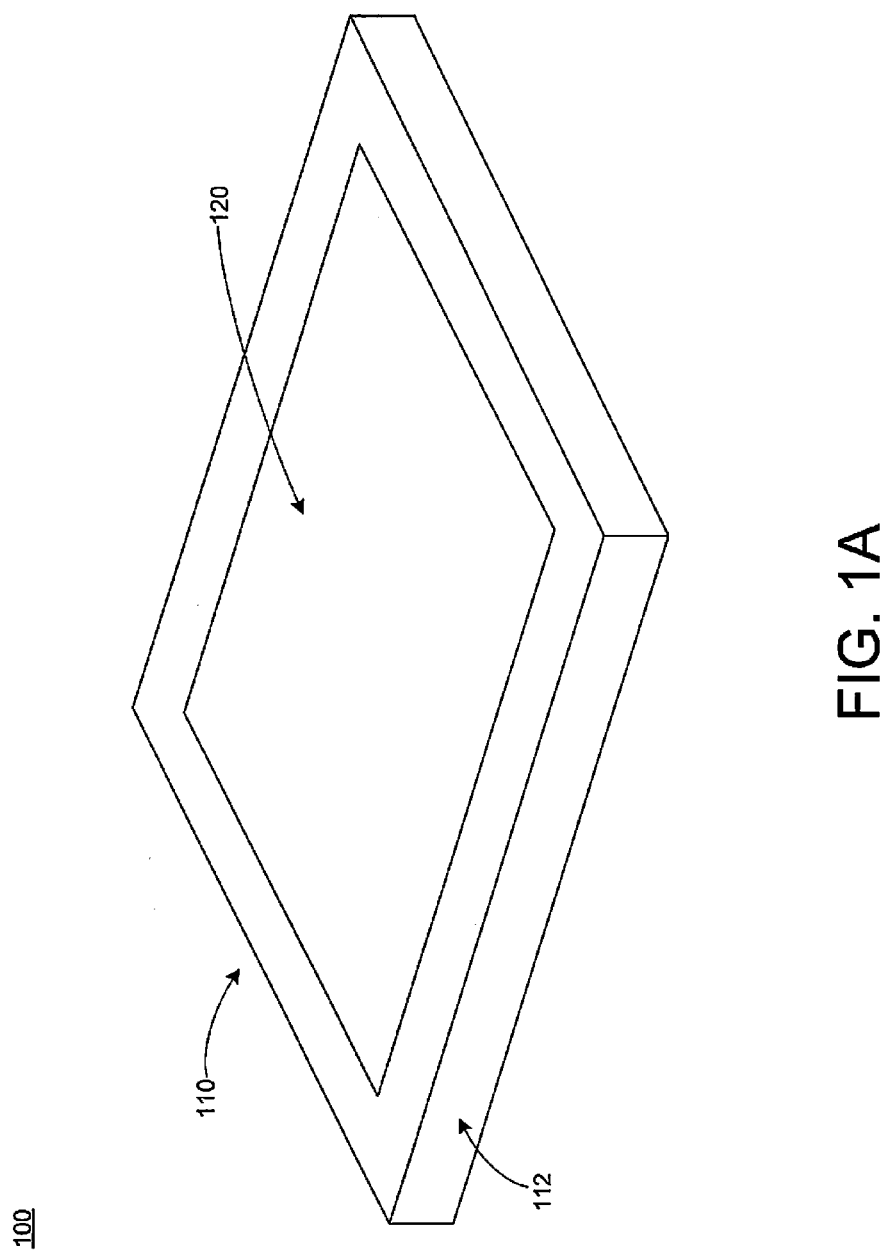
FIGS. 1A-1C are diagrams illustrating example devices having reinforced enclosures, in accordance with aspects of the disclosure.
Figure 1B:
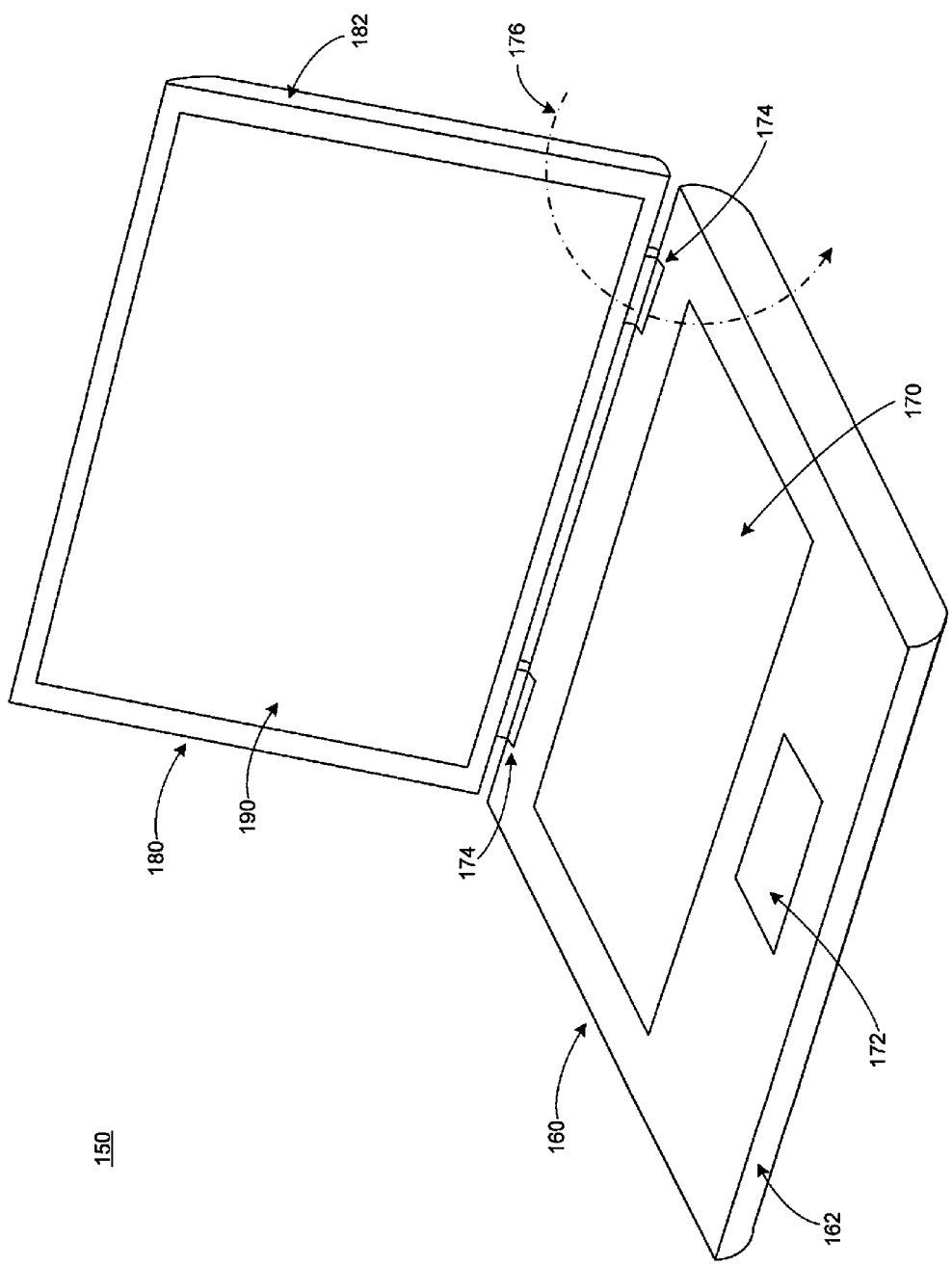
Figure 1C:
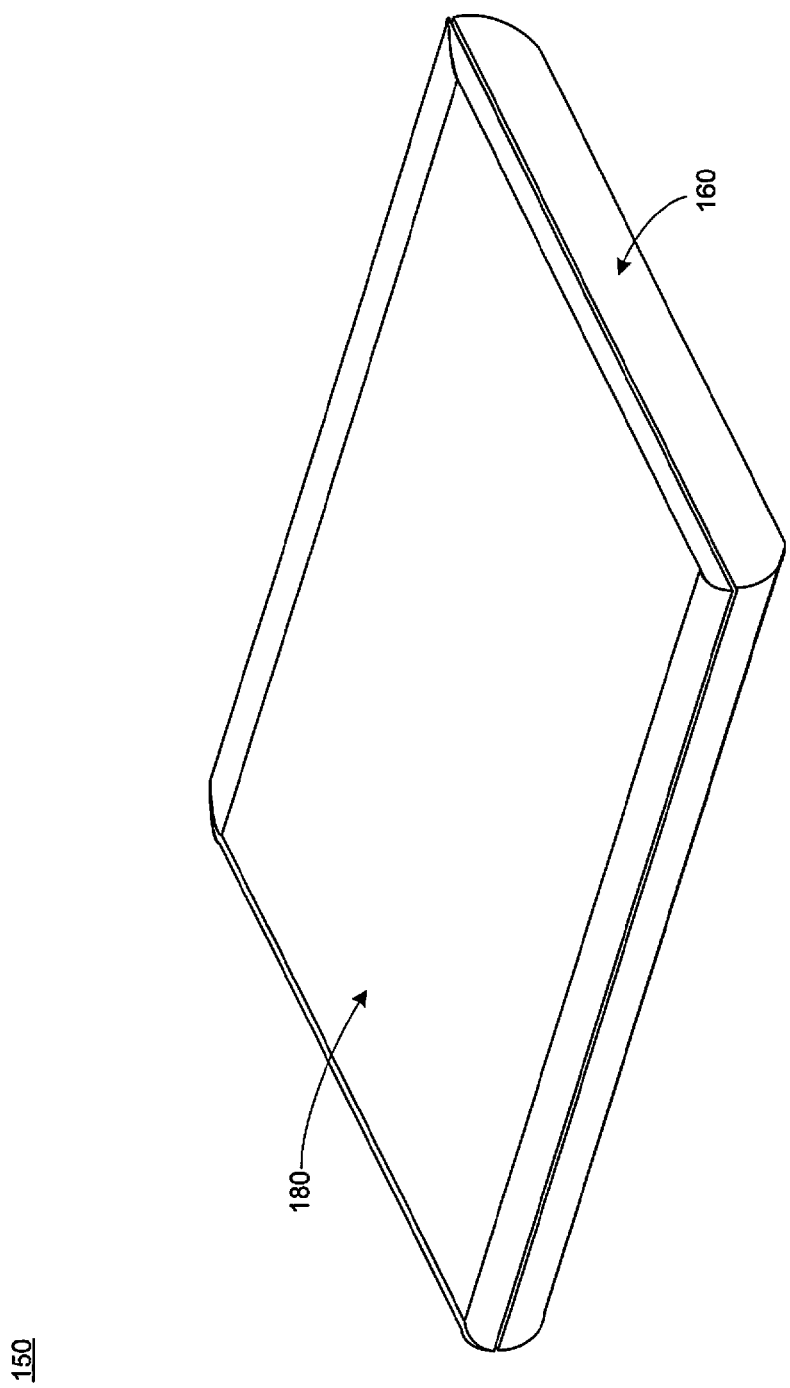

FIGS. 1A-1C are diagrams illustrating example devices having reinforced enclosures, in accordance with aspects of the disclosure.

In particular, FIG. 1A illustrates an example device or apparatus 100, such as a computing device or apparatus. In various examples, the device 100 may include a portable computing device including at least one of a tablet and a mobile phone. The device 100 may include an enclosure 110 with a user interface 120, such as, for example, at least one of a display (e.g., liquid crystal display (LCD), light emitting diode (LED) display, etc.), a touch-screen display (e.g., touch-screen LCD, LED, etc.), a touch sensor, a touch pad, and a trackpad. As described herein, the enclosure 110 may include a reinforced enclosure with fiber as a reinforcing component similar to the use of rebar as a material stiffening component. As such, in an example, the device 100 may include a laptop, and the enclosure 110 may include at least one of a laptop keyboard case and a laptop display case.

In the example of FIG. 1A, the device 100 may include the enclosure 110 that is configured for including and/or retaining internal circuitry including at least one processor and at least one memory. As further described herein, the enclosure 110 may include an internal frame (as shown, for example, in FIGS. 2A-2C) formed as an array (e.g., arrangement) of structural members arranged in a pattern (e.g., an arrangement of repeated or corresponding parts), and the internal frame may include one or more fibers applied to the pattern (e.g., on one or more sides) of the structural members. In various examples, the internal frame may include an irregular or random arrangement of structural members crossing over each other to form an irregular or random shape with the one or more fibers applied to (e.g., on one or more sides) the irregularly or randomly arranged structural members. In an example, the enclosure 110 may include a tensile fiber reinforced injection molded part, as described herein. In another example, stiffness may be selectively applied to an internal frame of the enclosure 110 with selective placement of reinforcing fibers, as described herein.

For instance, in an aspect of the disclosure, the enclosure 110 may include an outer shell 112 formed by injecting a material into a mold to thereby encase the internal frame in the material, and the material may be injected into the mold around the fibers applied to the pattern of the structural members. Further, in the example of FIG. 1A, the device 100 may include the user interface 120 coupled to the enclosure 110, and the user interface 120 may be configured to communicate with the internal circuitry included with and/or retained by the enclosure 110.

Further, FIG. 1B illustrates another example device or apparatus 150, such as a computing device or apparatus in an open configuration. FIG. 1C illustrates the device shown in FIG. 1B in a closed configuration. For example, the device 150 may include a portable computing device including a laptop. The device 150 may include a base enclosure 160 configured to include and/or retain internal circuitry including at least one processor and at least one memory. The base enclosure 160 may include one or more user interfaces, such as, for example, a first user interface 170 and a second user interface 172 including at least one of a keyboard and a touch sensor (e.g., touch pad, a trackpad, etc.). In accordance with aspects of the disclosure, as described herein, the enclosure 110 may include a reinforced enclosure with fiber as a reinforcing component similar to the use of rebar as a material stiffening component.

The device 150 may include a display enclosure 180 pivotally coupled to the base enclosure 160 with one or more hinges 174 and configured for movement 176 between an open position (as shown in FIG. 1B) and closed position (as shown in FIG. 1C). The display enclosure 180 may include a third user interface 190 including at least one of a display (e.g., LCD display, LED display, etc.), a touch-screen display (e.g., touch-screen LCD, LED, etc.), a touch sensor, a touch pad, a trackpad. As described herein, the enclosure 110 may include a reinforced enclosure with fiber as a reinforcing component similar to the use of rebar as a material stiffening component.

In the example of FIGS. 1B-1C, the device 150 may include the base enclosure 160 that is configured for including and/or retaining internal circuitry including at least one processor and at least one memory. As further described herein, the base enclosure 160 may include an internal frame (as shown, for example, in FIGS. 2A-2C) formed as an array of structural members arranged in a pattern, and the internal frame may include one or more fibers applied to the pattern of the structural members. The base enclosure 160 may include an outer shell 162 formed by injecting a material into a mold to thereby encase the internal frame in the material, and the material may be injected into the mold around the fibers applied to the pattern of the structural members of the base enclosure 160. The device 150 may include one or more of the user interfaces 170, 172 coupled to the base enclosure 160, and the one or more user interfaces 170, 172 may be configured to communicate with the internal circuitry included with and/or retained by the base enclosure 160.

Further, in the example of FIGS. 1B-1C, the device 150 may include the display enclosure 180 that is configured for including and/or retaining the at least one user interface 190. As further described herein, the display enclosure 180 may include an internal frame (as shown, for example, in FIGS. 2A-2C) formed as an array of structural members arranged in a pattern, and the internal frame may include one or more fibers applied to the pattern of the structural members. The display enclosure 180 may include an outer shell 182 formed by injecting a material into a mold to thereby encase the internal frame in the material, and the material may be injected into the mold around the fibers applied to the pattern of the structural members of the display enclosure 180. The device 150 may include the user interface 190 coupled to the display enclosure 180, and the user interface 190 may be configured to communicate with the internal circuitry included with and/or retained by the base enclosure 160.

In the various examples of FIGS. 1A-1C, the enclosures 110, 150, 160 of the devices 100, 150, respectively, may be referred to as housings or any type of structure that may be used as an enclosure and/or a housing. In these examples, the enclosures 110, 150, 160 may be formed to include and define one or more interior and exterior side surfaces of the devices 100, 150, respectively, and one or more other exterior top and/or bottom surfaces of the devices 100, 150, respectively.

Figure 2A:
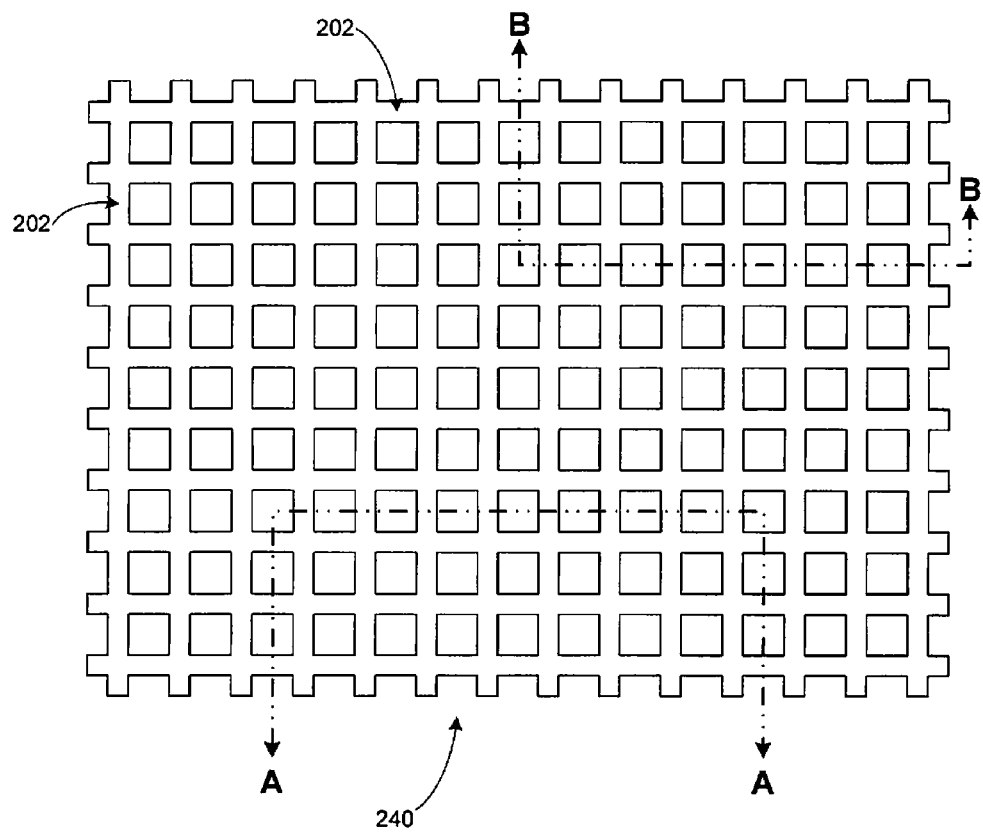
FIGS. 2A-2C are diagrams illustrating example internal frame structures for reinforced enclosures, in accordance with aspects of the disclosure.
Figure 2B:
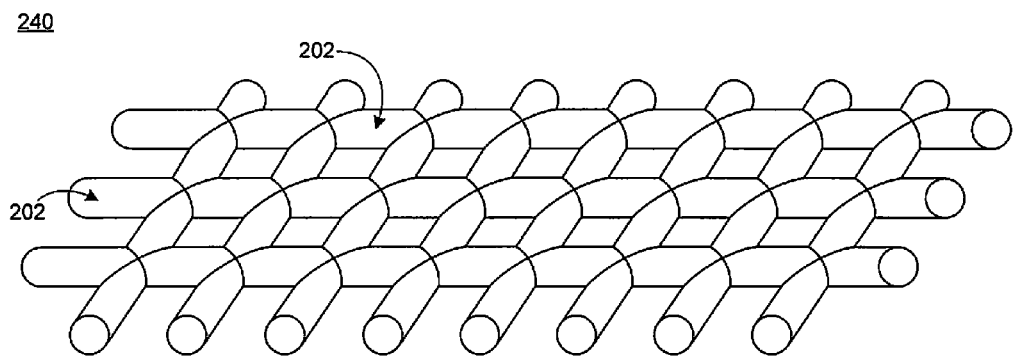
Figure 2C:
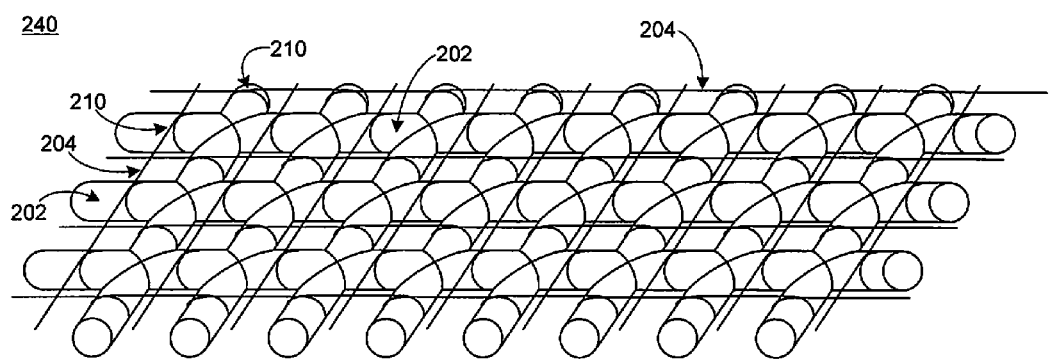

FIGS. 2A-2C are diagrams illustrating example internal frame structures for reinforced enclosures, in accordance with aspects of the disclosure.

In particular, FIG. 2A illustrates a two-dimensional view of an example internal frame 200 formed as an array of structural members 202 arranged in a pattern, FIG. 2B illustrates a three-dimensional view of a portion 240 of the example internal frame 240 taken along the line A-A without applied fibers (e.g., reinforcing fibers), and FIG. 2C illustrates a three-dimensional view the portion 240 of the example internal frame 240 taken along the line A-A with applied fibers 204 (e.g., reinforcing fibers). As described herein, the internal frame 200 may be used in the enclosure 110.

In various alternate examples, the internal frame 200 may include an irregular or random arrangement of the structural members 202 crossing over each other to form an irregular or random shape with the one or more fibers weaved into and/or wound around the irregularly or randomly arranged structural members.

In various examples, the array of structural members 202 may be formed and/or configured in various geometric type arrays (e.g., rectangular array, triangular array, various types of polygonal arrays including hexagonal array, etc.), and the pattern may include a grid pattern (e.g., framework of crisscrossing members, such as the structural members 202). For instance, as shown in FIG. 2A, the grid pattern of the structural members 202 of the internal frame 200 may be formed in various types of structures, such as, for example, a waffle type structure or a lattice type structure with the structural members 202 crossing over each other to form a pattern, such as a rectangular pattern. In various examples, the array of structural members 202 may be configured in any type of array, and the pattern may include any type of pattern. Further, the grid pattern of the structural members 202 may be formed in any type of structural pattern.

In an example, as shown in FIGS. 2B-2C, the structural members 202 of the internal frame 200 may include intersecting cylindrical bodies of material arranged in the pattern, such as, for example, a rectangular grid pattern. The structural members 202 of the internal frame 200 may include solid cylindrical bodies of material including at least one of thermoplastic, thermoset polymer, other related plastics and/or polymers, various metals or alloys thereof, and/or various other structural type materials. In other examples, various other plastics and/or polymers may be utilized including polycarbonate (PC), acrylonitrile butadiene styrene (ABS) polymer, or PC/ABS blends. The structural members 202 of the internal frame 200 may include hollow tubular bodies of material including at least one of plastic and metal. In various other examples, the structural members 202 may include any type of geometrical shape, contour, or elevation (e.g., triangular, rectangular, polygonal, ellipsoidal, elliptical, spiral, star, oval, etc.), without departing from the scope of the disclosure.

Further, as shown in FIGS. 2A-2C, the internal frame 200 may be formed flat (e.g., injection molded flat) in that the intersecting cylindrical bodies of the structural members 202 are in a same plane. For instance, the internal frame 200 may include the intersecting cylindrical bodies of material such that the structural members 202 may be arranged in a flat pattern, such as, for example, a flat rectangular grid pattern. However, in some examples, the cylindrical bodies may be formed in different planes. For instance, horizontal cylindrical bodies in a first plane may orthogonally cross vertical cylindrical bodies in a second plane different from the first plane to form the grid pattern.

Further, in another example, as shown in FIG. 2C, reinforcing fibers 204 may be applied to the structural members 202 of the internal frame 200. The internal frame 200 may be used in the enclosure 110 to fabricate a reinforced enclosure with the reinforcing fibers 204 as a reinforcing component. The reinforcing fibers 204 may be applied to the structural members 202 of the internal frame 200 by weaving and/or interlacing the reinforcing fibers 204 into and/or between the structural members 202 of the internal frame 200. In some examples, weaving/interlacing may be referred to as combining the fibers 204 and the structural members 202 into a connected whole, and/or weaving/interlacing may be referred to as fabricating a composition by combining the fibers 204 and the structural members 202 into a connected whole.

In various examples, the reinforcing fibers 204 may be applied to or weaved into the structural members 202 in any pattern and/or irregular/random shape, horizontally/vertically in any direction, and/or diagonally at any angular direction relative to the position or placement of the structural members 202 of the internal frame 200.

Further, in another example, the reinforcing fibers 204 may include high-tensile strength fibers that are weaved and/or interlaced into and/or between the structural members 202 of the internal frame 200 with adjustable spacing. For instance, the reinforcing fibers 204 may be evenly spaced apart or unevenly spaced apart. In another instance, one or more reinforcing fibers 204 may be interposed between the cylindrical bodies of the structural members 202 in a parallel or an unparallel manner. As such, even though FIG. 3C shows the internal frame 200 with one reinforcing fiber 204 interposed between the cylindrical bodies of the structural members 202, a plurality of reinforcing fibers 204 may be interposed between the cylindrical bodies of the structural members 202, without departing from the scope of the disclosure. In various examples, one or more of the fibers from the reinforcing fibers 204 may be aligned along a first axis (e.g., first longitudinal axis) that is non-parallel to a second axis (e.g., second longitudinal axis) aligned along at least one cylindrical body of the structural members 202.

Further, in another example, as shown in FIG. 2C, the reinforcing fibers 204 may be applied to the structural members 202 of the internal frame 200 by winding and/or coiling (e.g., 210) the reinforcing fibers 204 around the structural members 202 of the internal frame 200. The reinforcing fibers 204 may include high-tensile strength fibers that are wound and/or coiled around (e.g., 210) the structural members 202 of the internal frame 200 one or more times. In various examples, the reinforcing fibers 204 may be wound and/or coiled around the structural members 202 of the internal frame 200 tightly, loosely, or some combination thereof. Even though FIG. 2C shows the reinforcing fibers 204 with one wind and/or coil around the cylindrical bodies of the structural members 202, the reinforcing fibers 204 may be wound and/or coiled around the cylindrical bodies of the structural members 202 a plurality of times, without departing from the scope of the disclosure.

In various examples, the reinforcing fibers 204 may be applied to the structural members 202 of the internal frame 200 in uniform or non-uniform manner. As such, some areas of the structural members 202 may be coupled with reinforcing fibers 204 and other areas may not be coupled with reinforcing fibers 204. These areas may be formed with and may include various multiple grid shapes.

In an example, each end of the reinforcing fibers 204 may be terminated with a clove hitch. For instance, a clove hitch may include one or more knots used to secure the reinforcing fibers 204 to the structural members 202, which may include at least two half hitches made in opposite directions. In various other examples, any other type of hitch, knot, and/or useable line termination technique may be used, without departing from the scope of the disclosure.

In various implementations, the structural members 202 of the internal frame 200 and the reinforcing fibers 204 may be formed with a different material or a same material. In various examples, the structural members 202 of the internal frame 200 may include at least one of carbon material, Kevlar material, plastic material, and polymer material. In various other examples, the structural members 202 of the internal frame 200 may include a metal including at least one of aluminum, titanium, magnesium, chromoly, and steel including stainless steel.

Further, in various examples, the reinforcing fibers 204 may include at least one of carbon fibers, Kevlar fibers, plastic fibers, and polymer fibers. In various other examples, the reinforcing fibers 204 may include metal fibers including at least one of aluminum fibers, titanium fibers, magnesium fibers, chromoly fibers, and steel fibers including stainless steel fibers.

In another implementation, as described herein in reference to FIGS. 4A-6C, the structural members 202 of the internal frame 200 and the reinforcing fibers 204 may be formed with the same material as the injecting material. In an example, the injecting material may include at least one of plastic and polymer.

FIGS. 3A-1, 3A-2, 3A-3, and 3A-4 are diagrams illustrating profile views of the structural members 202a of the internal frame 200 and the reinforcing fibers 204, in accordance with aspects of the disclosure. As shown, the structural members 202a may include circular profiles, wherein the structural members 202a may include circular-shaped cylindrical bodies of material (e.g., solid or hollow) arranged in a pattern. In an aspect of the disclosure, round cylindrical structural members provide for no sharp edges so as to prevent damage to the reinforcing fibers during contact therewith. However, in various examples, the structural members 202a may include any geometric profile, wherein the structural members 202a may include any type of geometrically-shaped bodies of material (e.g., solid or hollow) arranged in any type of pattern or any type of irregular/random shape.

In various examples, the reinforcing fibers 204 may be wound around one or more of the structural members 202a. For instance, the reinforcing fibers 204 may be wound around each of the structural members 202a. In another instance, the reinforcing fibers 204 may be wound around every other one of the structural members 202a. In other instances, the reinforcing fibers 204 may be wound around any number of structural members 202a in any pattern or irregular/random shape.

Figures 1, 3A:
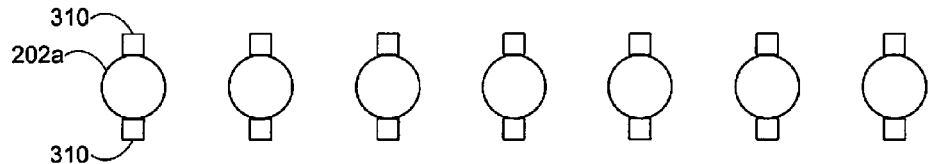
FIGS. 3A-1, 3A-2, 3A-3, and 3A-4 are diagrams illustrating profile views of the structural members 202 of the internal frame 200 and the reinforcing fibers 204, in accordance with aspects of the disclosure.

In particular, FIG. 3A-1 illustrates a two-dimensional profile view of the structural members 202a of the internal frame 200 taken along the line B-B, as shown in reference to FIG. 2A. Further, the internal frame 200 (as part of the outer shell 112 of the enclosure 110) may include one or more stand-offs 310 to hold the internal frame 200 away from one or more surfaces of the outer shell 112 of the enclosure 110 during injection molding, which is described in reference to FIGS. 4A-6C.

In accordance with aspects of the disclosure, high-tensile fibers are added to injection molded parts of the enclosure (e.g., the structural members of the internal frame) for reinforcement of the enclosure, and with use of the stand-offs, the fibers and the internal frame are less likely to interfere with cosmetic surfaces of the enclosure by keeping the fibers and the internal frame away from the exterior cosmetic surfaces of the enclosure during injection molding and during solidification. In various examples, the cosmetic surfaces of the enclosure 110 may include various glossy or flat colors including at least one of gloss black, flat black, gloss white, and/or flat white.

Figures 2, 3A:
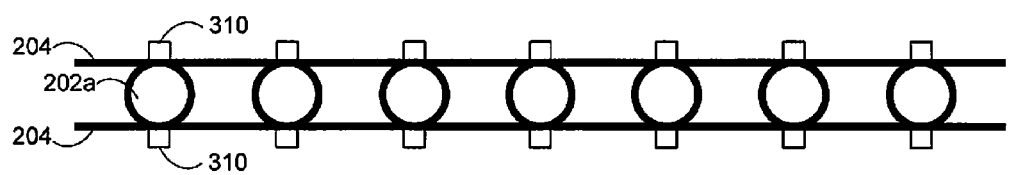

FIG. 3A-2 illustrates a two-dimensional profile view of the structural members 202a of the internal frame 200 of FIG. 3A-1 with the reinforcing fibers 204. In an example, as shown in FIG. 3A-2, the reinforcing fibers 204 may be applied to the structural members 202a of the internal frame 200 by weaving the reinforcing fibers 204 into the structural members 202a of the internal frame 200. The reinforcing fibers 204 may include high-tensile strength fibers that are weaved into the structural members 202a of the internal frame 200 with adjustable spacing.

In another example, as shown in FIG. 3A-2, the reinforcing fibers 204 may be applied to the structural members 202a of the internal frame 200 by winding the fibers around the structural members 202a of the internal frame 200. The reinforcing fibers 204 may include high-tensile strength fibers that are wound around the structural members 202a of the internal frame 200 one or more times.

Figures 3, 3A:
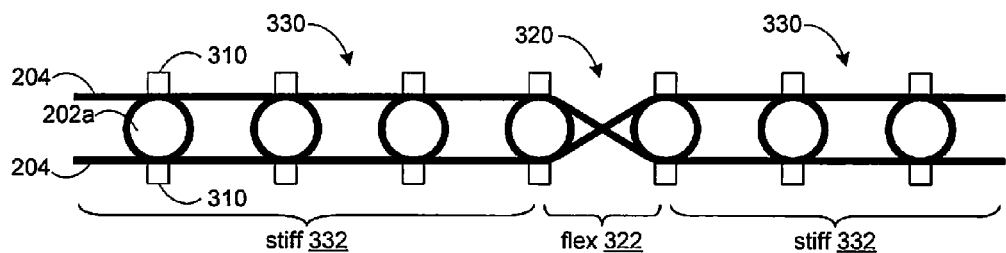

FIG. 3A-3 illustrates a two-dimensional profile view of the structural members 202a of the internal frame 200 of FIG. 3A-1 with one or more reinforcing fibers 204 crossing 320 to define a flex region 322. In an example, as shown in FIG. 3A-3, the reinforcing fibers 204 may be applied to the structural members 202a of the internal frame 200 by weaving and/or winding the reinforcing fibers 204 into and around the structural members 202a of the internal frame 200 and forming the cross 320 in the flex region 322. In this example, when one or more reinforcing fibers 204 are applied above and below 330 the structural members 202a of the internal frame 200, these one or more applied reinforcing fibers 204 define stiff regions 332 of the internal frame 200. Further, in this example, when one or more reinforcing fibers 204 are applied to cross 320, the flex region 322 may define a flexible portion of the internal frame 200 that may allow the enclosure 110 to bend and/or flex.

Figures 3, 3A, 4:
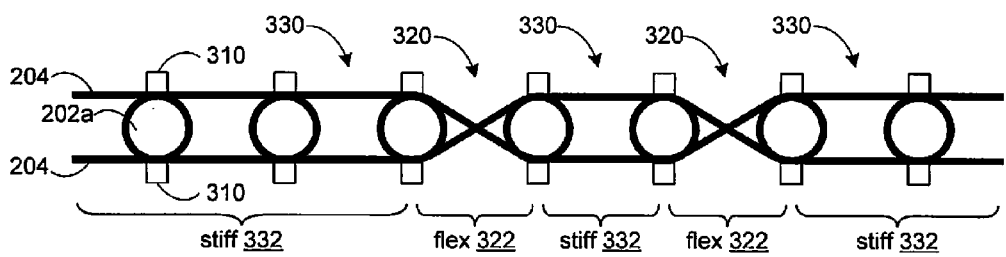

FIG. 3A-4 illustrates a two-dimensional profile view of the structural members 202a of the internal frame 200 of FIG. 3A-1 with one or more reinforcing fibers 204 crossing 320 in multiple regions to define multiple flex regions 322. In an example, as shown in FIG. 3A-4, the reinforcing fibers 204 may be applied to the structural members 202a of the internal frame 200 by weaving and/or winding the reinforcing fibers 204 into and around the structural members 202a of the internal frame 200 and forming the crossings 320 in the flex regions 322. In this example, when one or more reinforcing fibers 204 are applied above and below 330 the structural members 202a of the internal frame 200, these one or more applied reinforcing fibers 204 define stiff regions 332 of the internal frame 200. Further, in this example, when one or more reinforcing fibers 204 are applied to cross 320, the flex regions 322 may define a flexible portion of the internal frame 200 that may allow the enclosure 110 to bend and/or flex in multiple regions.

FIGS. 3B-1, 3B-2, 3B-3, and 3B-4 are diagrams illustrating profile views of the structural members 202b of the internal frame 200 and the reinforcing fibers 204, in accordance with aspects of the disclosure. As shown, the structural members 202b may include oval profiles, wherein the structural members 202b may include oval-shaped cylindrical bodies of material (e.g., solid or hollow) arranged in a pattern. In an aspect of the disclosure, oval cylindrical structural members provide for no sharp edges so as to prevent damage to the reinforcing fibers during contact therewith.

Figures 1, 3B:
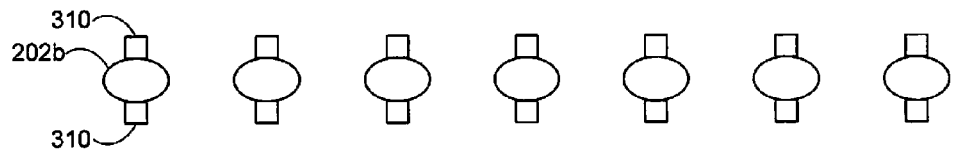
Figures 2, 3B:
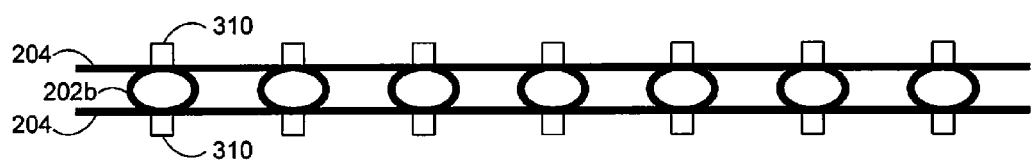
Figures 3, 3B:
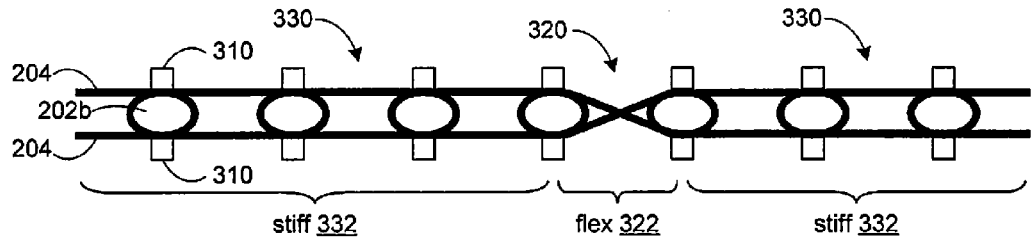
Figures 3, 3B, 4:
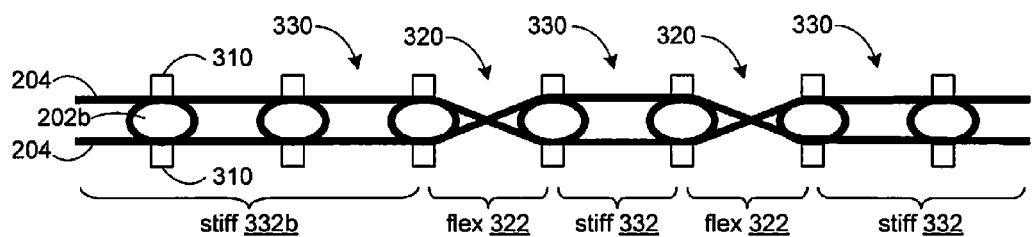

In particular, FIG. 3B-1 illustrates a two-dimensional profile view of the structural members 202b of the internal frame 200 taken along the line B-B, as shown in reference to FIG. 2A. Further, the internal frame 200 (as part of the outer shell 112 of the enclosure 110) may include one or more stand-offs 310 to hold the internal frame 200 away from one or more surfaces of the outer shell 112 of the enclosure 110 during injection molding, which is described in reference to FIGS. 4A-6C.

As shown and described herein, the examples of FIGS. 3B-1, 3B-2, 3B-3, and 3B-4 are similar to the examples of FIGS. 3A-1, 3A-2, 3A-3, and 3A-4 except that, for instance, the structural members 202b of the internal frame 200 are oval-shaped instead of circular-shaped cylindrical bodies. Therefore, the descriptions of FIGS. 3A-1, 3A-2, 3A-3, and 3A-4 may be applied to FIGS. 3B-1, 3B-2, 3B-3, and 3B-4.

Figure 4A:
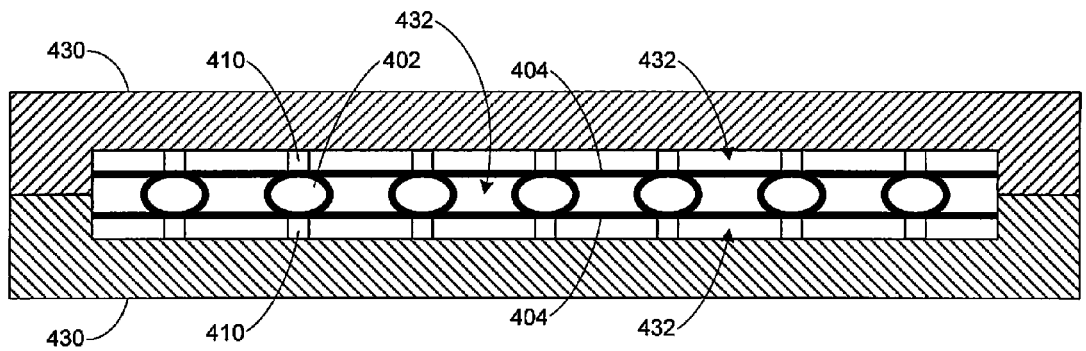
FIGS. 4A, 4B, and 4C are diagrams illustrating profile views of example injection molding assemblies, in accordance with aspects of the disclosure.
Figure 4B:
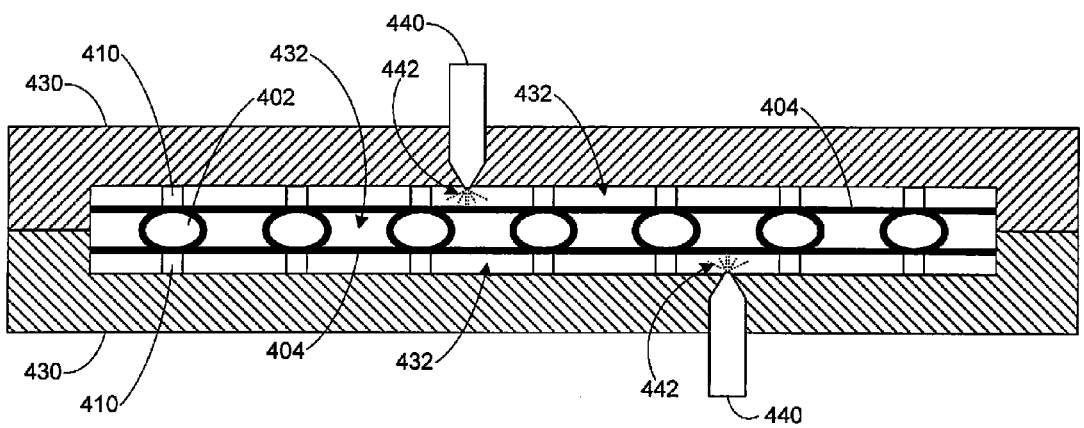
Figure 4C:
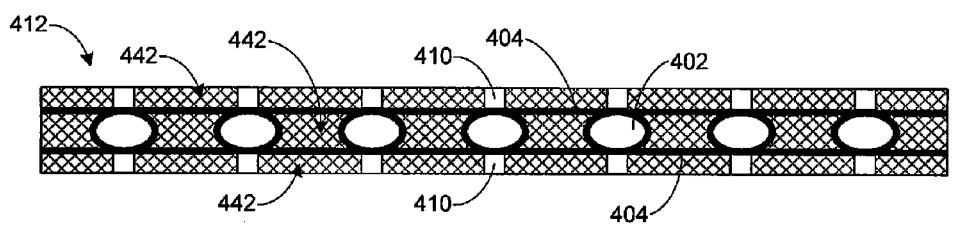

FIGS. 4A, 4B, and 4C are diagrams illustrating profile views of injection molding assemblies of an outer shell 412 (e.g., outer shell 112, 162, 182) of an enclosure (e.g., enclosures 110, 160, 180) to encase one or more structural members 402 (e.g., structural members 202) of an internal frame (e.g., internal frame 200) with one or more reinforcing fibers 404 (e.g., reinforcing fibers 204) and one or more stand-offs 410 (e.g., stand-offs 310), in accordance with aspects of the disclosure.

In particular, FIG. 4A is a diagram illustrating a profile view of a mold 430 enclosed around a cavity 432 including a framework of the outer shell 412 of the internal frame including the structural members 402, the reinforcing fibers 404 applied to the structural members 402, and the stand-offs 410 coupled to the structural members 402.

FIG. 4B is a diagram illustrating a profile view of using one or more injection tools 440 to inject a material 442 into the cavity 432 of the mold 430 enclosed around the framework of the outer shell 412 of the internal frame including the structural members 402, the reinforcing fibers 404 applied to the structural members 402, and the stand-offs 410 coupled to the structural members 402.

FIG. 4C is a diagram illustrating a profile view of the injection molded outer shell 412 encasing the framework of the internal frame including the structural members 402, the reinforcing fibers 404 applied to the structural members 402, and the stand-offs 410 coupled to the structural members 402.

In accordance with aspects of the disclosure, a device (e.g., device 100, 150) may include an enclosure including an internal frame formed as an array of structural members 402 arranged in a pattern. The internal frame may include reinforcing fibers 404 applied to the pattern of the structural members 402. The enclosure may include the outer shell 412 formed by injecting the material 442 into the mold 430 to thereby encase the internal frame in the material 442. The material 442 may be injected into the mold 430 around the reinforcing fibers 404 that may be applied to the pattern of the structural members 402. Further, in accordance with aspects of the disclosure, the device (e.g., device 100, 150) may include at least one user interface coupled to the enclosure, and the at least one user interface may be configured to communicate with the internal circuitry retained by the enclosure.

Figure 5A:
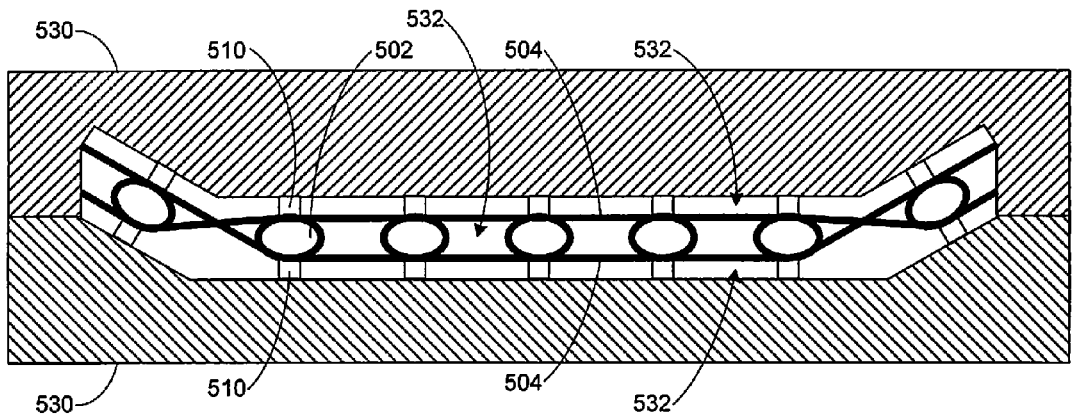
FIGS. 5A, 5B, and 5C are diagrams illustrating profile views of other example injection molding assemblies, in accordance with aspects of the disclosure.
Figure 5B:
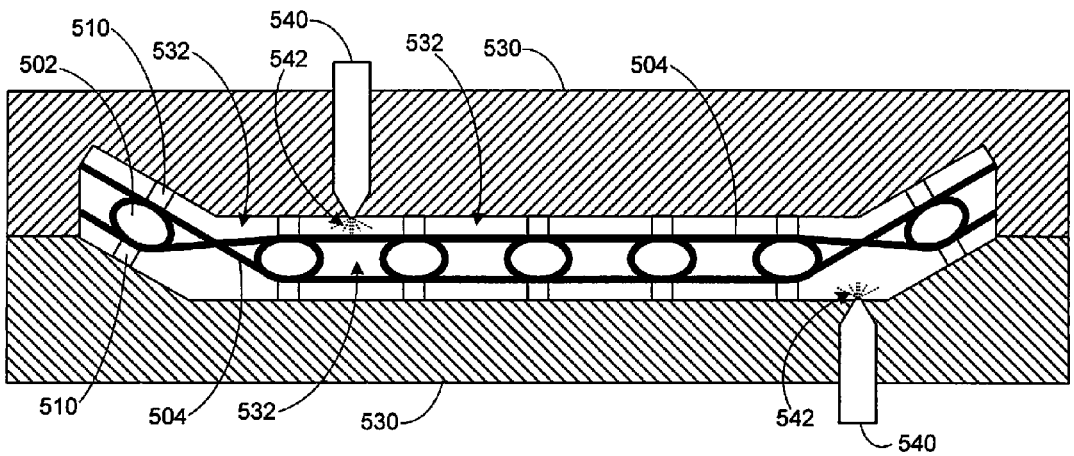
Figure 5C:
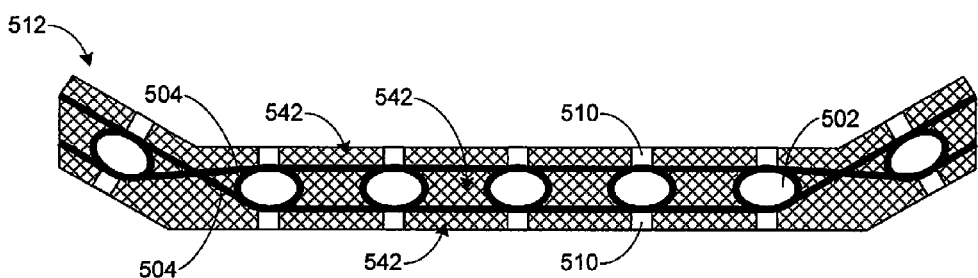

FIGS. 5A, 5B, and 5C are diagrams illustrating profile views of injection molding assemblies of a contoured outer shell 512 (e.g., outer shell 112, 162, 182 having a contour or curvature) of an enclosure (e.g., enclosures 110, 160, 180) to encase one or more contoured structural members 502 (e.g., structural members 202) of a contoured internal frame (e.g., internal frame 200 having a contour or curvature) with one or more reinforcing fibers 504 (e.g., reinforcing fibers 204 adapted to the contour or curvature of the contoured internal frame) and one or more stand-offs 510 (e.g., stand-offs 310), in accordance with aspects of the disclosure. In an example, the contour or curvature of the contoured internal frame may provide flex regions thereof.

In particular, FIG. 5A is a diagram illustrating a profile view of a contoured mold 530 enclosed around a contoured cavity 532 including a framework of the contoured outer shell 512 of the internal frame including the structural members 502, the reinforcing fibers 504 applied to the structural members 502, and the stand-offs 510 coupled to the structural members 502.

FIG. 5B is a diagram illustrating a profile view of using one or more injection tools 540 to inject a material 542 into the contoured cavity 532 of the contoured mold 530 enclosed around the framework of the contoured outer shell 512 of the internal frame including the structural members 502, the reinforcing fibers 504 applied to the structural members 502, and the stand-offs 510 coupled to the structural members 502.

FIG. 5C is a diagram illustrating a profile view of the injection molded contoured outer shell 512 encasing the contoured framework of the internal frame including the structural members 502, the reinforcing fibers 504 applied to the structural members 502, and the stand-offs 510 coupled to the structural members 502.

In accordance with aspects of the disclosure, a device (e.g., device 100, 150) may include a contoured enclosure including a contoured internal frame formed as an array of structural members 502 arranged in a contoured pattern. The contoured internal frame may include reinforcing fibers 504 applied to the contoured pattern of the structural members 502. The contoured enclosure may include the contoured outer shell 512 formed by injecting the material 542 into the contoured mold 530 to thereby encase the contoured internal frame in the material 542. The material 542 may be injected into the mold 530 around the reinforcing fibers 504 that may be applied to the contoured pattern of the structural members 502. Further, in accordance with aspects of the disclosure, the device (e.g., device 100, 150) may include at least one user interface coupled to the contoured enclosure, and the at least one user interface may be configured to communicate with the internal circuitry retained by the contoured enclosure.

Figure 6A:
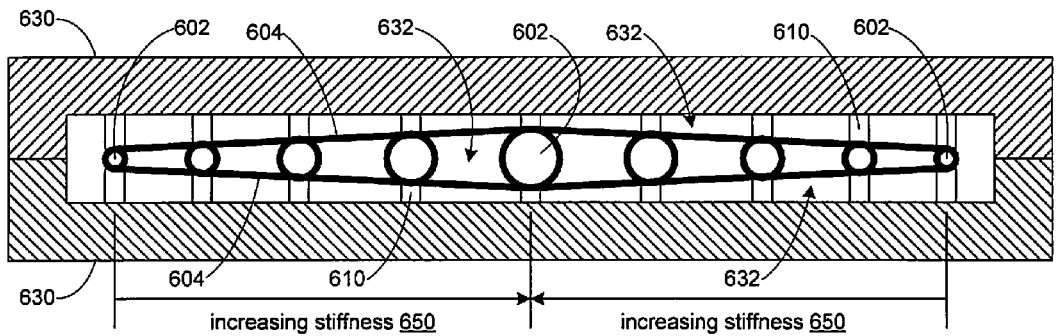
FIGS. 6A, 6B, and 6C are diagrams illustrating profile views of still other example injection molding assemblies, in accordance with aspects of the disclosure.
Figure 6B:
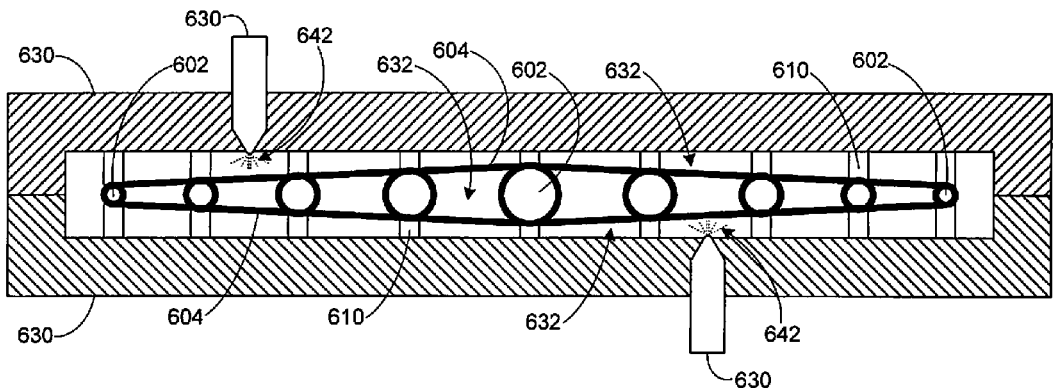
Figure 6C:
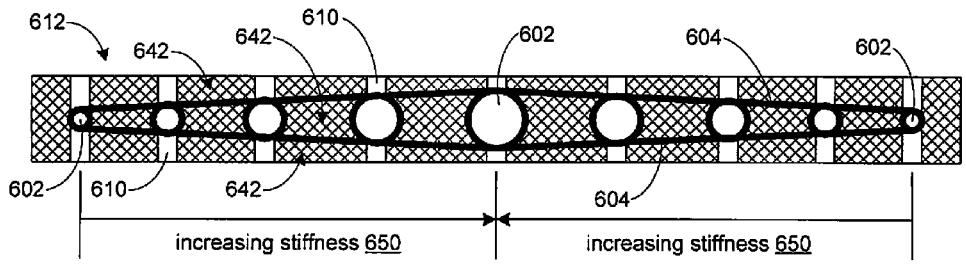

FIGS. 6A, 6B, and 6C are diagrams illustrating profile views of injection molding assemblies of an outer shell 612 (e.g., outer shell 112, 162, 182) of an enclosure (e.g., enclosures 110, 160, 180) to encase one or more structural members 602 (e.g., structural members 202 having different dimensions, such as different diameters or cross sectional areas) of an internal frame (e.g., internal frame 200) with one or more reinforcing fibers 604 (e.g., reinforcing fibers 204) and one or more stand-offs 610 (e.g., stand-offs 310), in accordance with aspects of the disclosure.

In particular, FIG. 6A is a diagram illustrating a profile view of a mold 630 enclosed around a cavity 632 including a framework (e.g., selectively defined stiffness) of the outer shell 612 of the internal frame including the structural members 602 having different dimensions (e.g., different diameters, widths, cross-sectional areas, etc.), the reinforcing fibers 604 applied to the structural members 602, and the stand-offs 610 coupled to the structural members 602. For instance, as shown in the example of FIG. 6A, the diameter dimension (or width dimension) of the structural members 602 may be varied to provide increasing stiffness 650 (e.g., from smaller diameter structural members to larger diameter structural members) to thereby vary a stiffness of the injection molded outer shell 612. In this instance, the larger the diameter (or width) of the structural members 602, the stiffer the resultant region of the outer shell 612 that includes larger diameter (or wider) structural members 602. In various examples, the outer shell 612 may include one or more larger diameter structural members 602 in any position, region, and/or direction across the outer shell 612 to provide a stiffer structure in particular regions of the outer shell 612. In various examples, the stand-offs 610 may vary in size and/or dimensions including length, width, etc., and as such, the stand-offs 610 may be increased or decreased in size and/or dimensions to accommodate a desired distance between the structural members 602 and an outer surface of the outer shell 612.

FIG. 6B is a diagram illustrating a profile view of using one or more injection tools 640 to inject a material 642 into the cavity 632 of the mold 630 enclosed around the framework (e.g., having selectively defined stiffness) of the outer shell 612 of the internal frame including the structural members 602 (e.g., structural members 202 having different dimensions, such as different diameters and/or widths), the reinforcing fibers 604 applied to the differently sized structural members 602, and the stand-offs 610 coupled to the differently sized structural members 602.

FIG. 6C is a diagram illustrating a profile view of the injection molded outer shell 612 encasing the framework (e.g., having selectively defined stiffness) of the internal frame including the structural members 602 (e.g., structural members 202 having different dimensions, such as different diameters and/or widths), the reinforcing fibers 604 applied to the differently sized structural members 602, and the stand-offs 610 coupled to the differently sized structural members 602.

In an aspect of the disclosure, the use of selectively defined diameters or dimensions of the structural members 602 of the internal frame of the enclosure provide for selective stiffening for the enclosure where desirable to increase the strength in the particular position or area of the reinforced enclosure of the device. As such, in various examples, one or more areas of the enclosure may be stiffened with reinforcing fibers to provide improved protection in those one or more areas.

In accordance with aspects of the disclosure, a device (e.g., device 100, 150) may include an enclosure including an internal frame formed as an array of structural members 602 having different dimensions (e.g., different diameters or widths) arranged in a pattern. The internal frame may include reinforcing fibers 604 applied to the pattern of the structural members 602 having different dimensions. The enclosure may include the outer shell 612 formed by injecting the material 642 into the mold 630 to thereby encase the internal frame in the material 642. The material 642 may be injected into the mold 630 around the reinforcing fibers 604 that may be applied to the pattern of the structural members 602 having different dimensions. Further, in accordance with aspects of the disclosure, the device (e.g., device 100, 150) may include at least one user interface coupled to the enclosure, and the at least one user interface may be configured to communicate with the internal circuitry retained by the enclosure.

Figure 7:
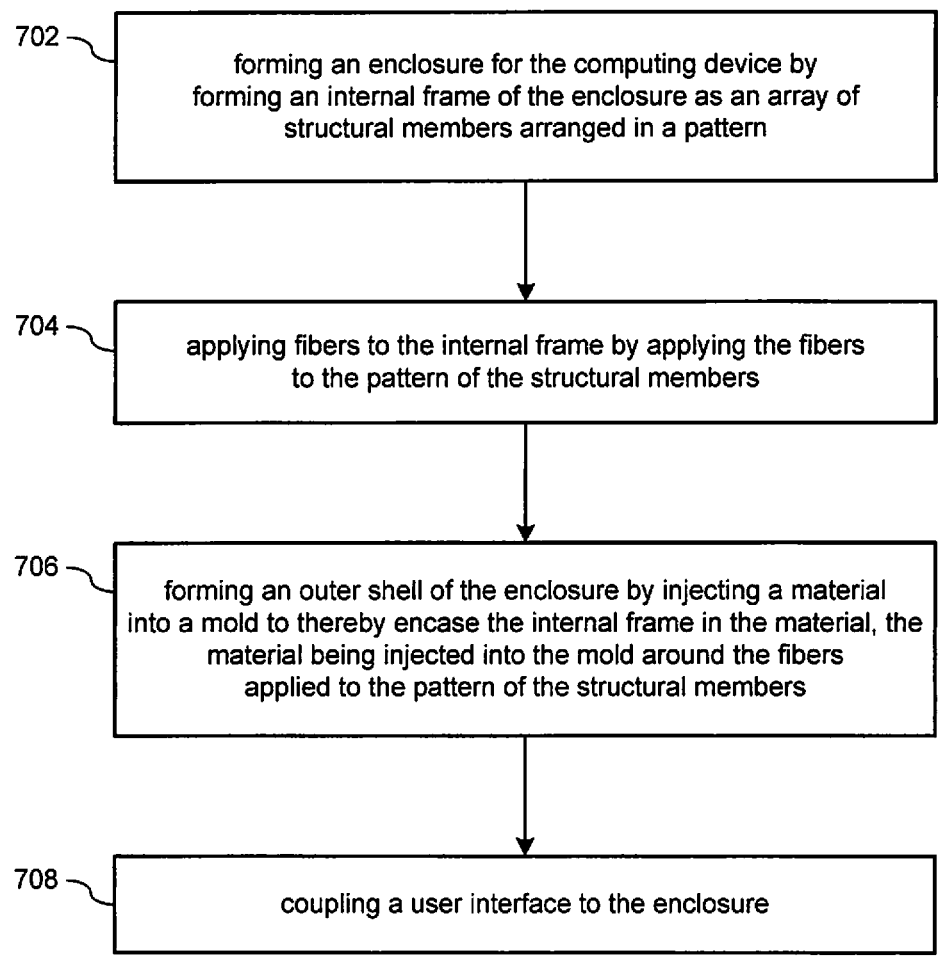
FIG. 7 is a process flow illustrating an example method for assembling an example device, in accordance with aspects of the disclosure.

FIG. 7 is a process flow illustrating an example method for assembling an example device (e.g., computing device), in accordance with aspects of the disclosure.

In the example of FIG. 7, operations 702-708 are illustrated as discrete operations occurring in sequential order. However, in other implementations, two or more of the operations 702-708 may occur in a partially or completely overlapping or parallel manner, or in a nested or looped manner, or may occur in a different order than that shown. Further, one or more additional operations, that may not be specifically illustrated in the example of FIG. 7, may also be included in some implementations, while in other implementations, one or more of the operations 702-708 may be considered optional or omitted.

In the example of FIG. 7, at 702, the method 700 may include forming an enclosure (e.g., enclosure 110, 160, 180) for a computing device (e.g., device 100, 150) including forming an internal frame (e.g., internal frame 200) of the enclosure (e.g., enclosure 110, 160, 180) as an array of structural members (e.g., structural members 202) arranged in a pattern. The enclosure (e.g., enclosure 110, 160, 180) may be configured for retaining internal circuitry including at least one processor and at least one memory.

In various examples, the array may include a rectangular array, and the pattern may include a grid pattern. The grid pattern of the structural members of the internal frame may be formed in a waffle type structure or a lattice type structure with the structural members crossing over each other to form a rectangular pattern. The structural members of the internal frame may include intersecting cylindrical bodies of material arranged in the pattern. The structural members of the internal frame may include solid or hollow cylindrical bodies of material including at least one of plastic and metal.

At 704, the method 700 may include forming the enclosure (e.g., enclosure 110, 160, 180) including applying fibers (e.g., reinforcing fibers 204) to the internal frame (e.g., internal frame 200) by applying the fibers (e.g., reinforcing fibers 204) to the pattern of the structural members (e.g., structural members 202).

In an example, applying the fibers to the structural members of the internal frame may include weaving and/or interlacing the fibers into and between the structural members of the internal frame. In some examples, the fibers may include high-tensile strength fibers that are weaved and/or interlaced into and between the structural members of the internal frame with adjustable spacing.

In another example, applying the fibers to the structural members of the internal frame may include winding and/or coiling the fibers in and/or around the structural members of the internal frame. In some examples, the fibers may include high-tensile strength fibers that are wound and/or coiled in and/or around the structural members of the internal frame one or more times.

At 706, the method 700 may include forming an outer shell of the enclosure (e.g., enclosure 110, 160, 180) by injecting a material into a mold to thereby encase the internal frame (e.g., internal frame 200) in the material. The material may be injected into the mold around the fibers (e.g., reinforcing fibers 204) applied to the pattern of the structural members (e.g., structural members 202).

At 708, the method 700 may include coupling a user interface (e.g., user interface 120, 170, 172, 190) to the enclosure (e.g., enclosure 110, 160, 180). The user interface may be configured to communicate with the internal circuitry retained by the enclosure (e.g., enclosure 110, 160, 180).

In an implementation, the method 700 may include terminating each end of the fibers with a clove hitch or some variation thereof. In another implementation, the method 700 may include coupling stand-offs to hold the internal frame away from one or more surfaces of the outer shell of the enclosure.

In various implementations, the structural members of the internal frame and the fibers may be formed with a different material or a same material including at least one of plastic and polymer. For instance, the structural members of the internal frame and the fibers may include at least one of carbon, Kevlar, plastic, polymer, and steel including stainless steel. Various other metal may be used and/or included, such as, for example, aluminum, titanium, magnesium, and chromoly.

In accordance with aspects of the disclosure, a device or an apparatus may be manufactured, fabricated, and/or assembled using the method of FIG. 7. For instance, an apparatus may include internal circuitry including at least one processor and at least one memory, and the apparatus may include an enclosure configured to retain the internal circuitry. The enclosure may be manufactured, fabricated, and/or assembled by forming an internal frame for the enclosure as an array of intersecting cylindrical structural members arranged in a grid pattern resembling a waffle, applying high-tensile strength fibers to the internal frame by disposing (e.g., by weaving) the high-tensile strength fibers into contact with the structural members and/or by disposing (e.g., by winding) the high-tensile strength fibers around the structural members one or more times, and forming an outer shell of the enclosure by injecting a plastic material into a mold to thereby encase the internal frame in the plastic material. In this instance, the plastic material may be injected into the mold around the high-tensile strength fibers weaved into and wound around the structural members of the internal frame. Further, in this instance, an apparatus may include a user interface coupled to the enclosure, and the user interface may be configured to communicate with the internal circuitry retained by the enclosure.

In accordance with aspects of the disclosure, a device or an apparatus may be manufactured, fabricated, formed and/or assembled with one or more fiber reinforced enclosures, such as, for example, miniaturized fiber/rebar reinforced enclosures. In an example, the fibers may be weaved into an internal frame (e.g., the frame may be formed as a matrix), and a material may be injected in and around the fibers.

In various examples, the internal frame may include at least one of carbon material, Kevlar material, plastic material, polymer material, and in other examples, the internal frame may include a metal material including at least one of aluminum, titanium, magnesium, chromoly, and steel including stainless steel. Further, in various examples, the fibers may include at least one of carbon fibers, Kevlar fibers, plastic fibers, and polymer fibers, and in other examples, the fibers may include metal fibers including at least one of aluminum fibers, titanium fibers, magnesium fibers, chromoly fibers, and steel fibers including stainless steel fibers.

In various examples, the use of term weave may include the use of one or more of the terms interlace, coalesce, combine, mingle, comingle, and intermingle. The use of the term fiber may include the use of the term rebar, which may include the use of the term rod or bar, which may be used as reinforcement components in a material.

Figure 8:
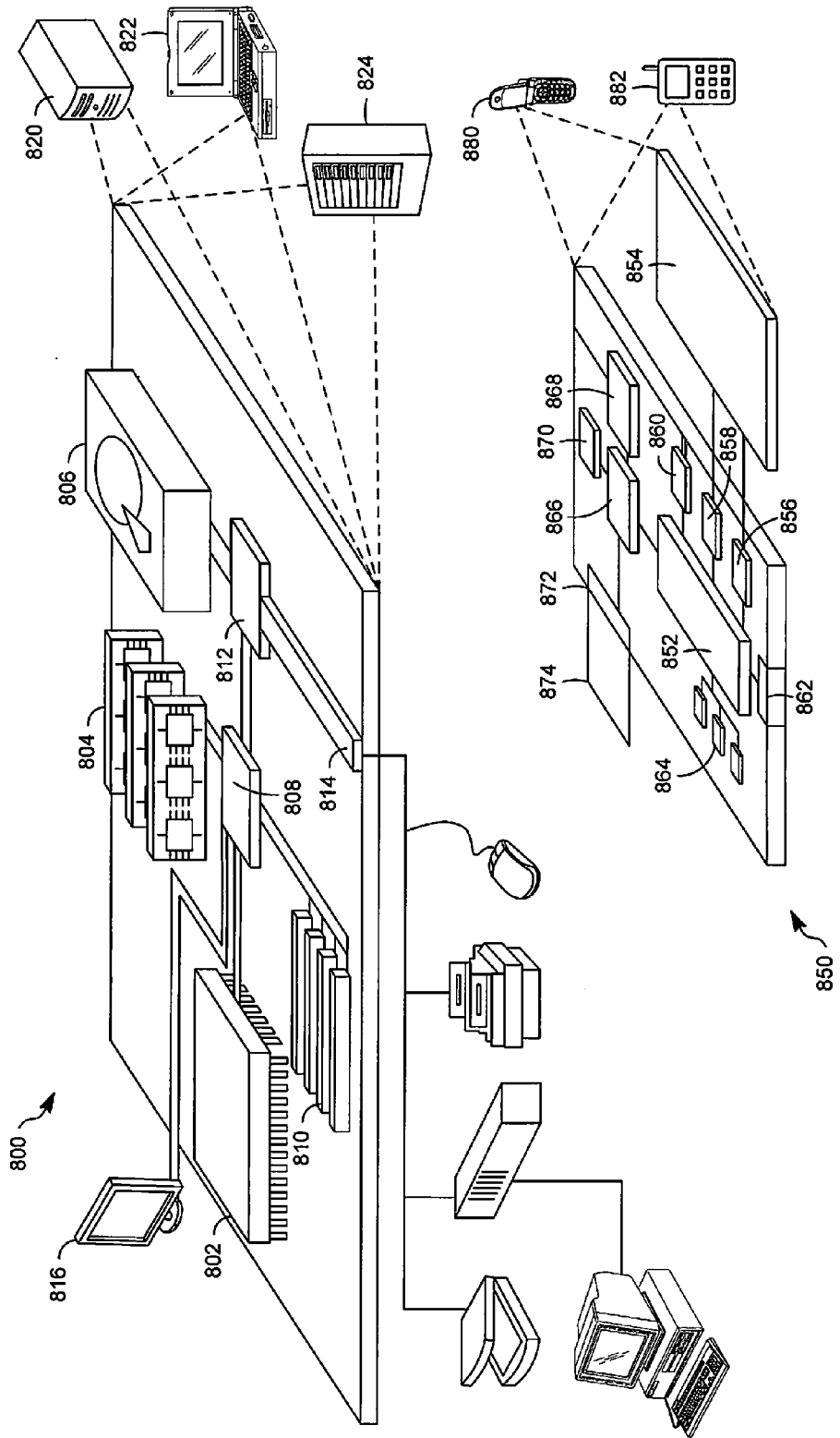
FIG. 8 is a block diagram illustrating example or representative computing devices and associated elements that may be used to implement one or more systems, devices, and methods of FIGS. 1-7, in accordance with aspects of the disclosure.

FIG. 8 is a diagram illustrating example or representative devices, such as computing devices, portable computing devices etc., and associated elements including various internal circuitry and enclosures (or portions thereof) that may be used to implement one or more systems, devices, apparatuses, and methods of FIGS. 1A-7, in accordance with aspects of the disclosure.

In an implementation, FIG. 8 shows an example of a computer device 800 and a mobile computer device 850 (e.g., mobile communication device including a low-power mobile communication device, such as, for example, mobile phone, cellular phone, etc.), which may be used in accordance with aspects, methods, and techniques, as described and provided herein. The computing device 800 may represent various forms of digital computers, such as personal computers, laptops, tablets, desktops, workstations, personal digital assistants, servers, blade servers, mainframes, and other appropriate computers. The computing device 850 may represent various forms of mobile devices, such as personal digital assistants, cellular telephones, smart phones, and other similar computing devices. The components shown herein, their connections and relationships, and their functions, are meant to be exemplary only, and are not meant to limit implementations described herein and/or claimed in this disclosure.

The computing device 800 may include one or more processors 802, memory 804, a storage device 806, a high-speed interface 808 connecting to memory 804 and high-speed expansion ports 810, and a low speed interface 812 connecting to low speed bus 814 and storage device 806. One or more of the components 802, 804, 806, 808, 810, and 812, are interconnected using various busses, and may be mounted on a common motherboard or in other manners as appropriate. In an implementation, the processor 802 may be configured to process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be utilized, as appropriate, along with multiple memories and types of memory. Further, multiple computing devices 800 may be connected, with the device providing portions of the necessary operations (e.g., as a server bank, a group of blade servers, or a multi-processor system).

The memory 804 may be configured to store information within the computing device 800. In an implementation, the memory 804 may comprise one or more volatile memory units. In another implementation, the memory 804 may comprise one or more non-volatile memory units. The memory 804 may comprise another form of non-transitory computer-readable medium, such as a magnetic or optical disk.

The storage device 806 may be configured for providing mass storage for the computing device 800. In an implementation, the storage device 806 may comprise a non-transitory computer-readable medium, such as a floppy disk device, a hard disk device, an optical disk device, or a tape device, a flash memory, or other similar solid state memory device, or an array of devices, including devices configured for use in a storage area network or various other configurations. In some implementations, a computer program product may be tangibly embodied in an information carrier. The computer program product may include instructions that, when executed, perform one or more methods, such as those described herein. In another implementation, the information carrier may comprise a non-transitory computer-readable medium or a non-transitory machine-readable medium, such as the memory 804, the storage device 806, or memory on the processor 802.

The high speed controller 808 may be configured to manage bandwidth-intensive operations for the computing device 800, while the low speed controller 812 may be configured to manage lower bandwidth-intensive operations. Such allocation of functions may be exemplary only. In an implementation, the high-speed controller 808 may be coupled to the memory 804, the display 816 (e.g., through a graphics processor or accelerator), and/or to the high-speed expansion ports 810, which may be configured to accept various expansion cards (not shown). In the implementation, low-speed controller 812 may be coupled to the storage device 806 and/or the low-speed expansion port 814, wherein the low-speed expansion port, which may include various communication ports (e.g., USB, Bluetooth, Ethernet, wireless Ethernet, etc.) may be coupled to one or more input/output devices, such as a keyboard, a pointing device, a scanner, or a networking device, such as a switch or router, e.g., through a network adapter.

The computing device 800 may be implemented in a number of different forms, in a manner as shown in FIG. 8. For example, the computing device 800 may be implemented as a standard server 820, or multiple times in a group of such servers. The computing device 800 may be implemented as part of a rack server system 824. In addition, the computing device 800 may be implemented in a personal computer (PC), such as a laptop computer 822. In another implementation, components from the computing device 800 may be combined with other components in a mobile device (not shown), such as device 850. One or more of such devices may include one or more of computing devices 800, 850, and an entire system may be made up of multiple computing devices 800, 850 communicating with one another.

The computing device 850 may include one or more processors 852, memory 864, an input/output device, such as a display 854, a communication interface 866, and a transceiver 868, among various other components. The device 850 may be provided with a storage device, such as a micro-drive or some other related device, to provide additional storage. One or more of the components 850, 852, 864, 854, 866, and 868 may be interconnected using various buses, and several of the components may be mounted on a common motherboard or in other manners as appropriate.

The processor 852 may be configured to execute instructions within the computing device 850, including instructions stored in the memory 864. The processor 852 may be implemented as a chipset of chips that include separate and multiple analog and digital processors. In an implementation, the processor 852 may provide for coordination of the other components of the device 850, such as control of user interfaces, applications run by device 850, and wireless communication by device 850.

The processor 852 may be configured to communicate with a user through a control interface 858 and a display interface 856 coupled to a display 854. The display 854 may comprise, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In an implementation, an external interface 862 may be provide in communication with the processor 852 to enable near area communication of device 850 with various other devices. In an example, the external interface 862 may provide for wired communication in some implementations, or for wireless communication in other implementations, and multiple interfaces may be utilized.

The memory 864 may be configured to store information within the computing device 850. The memory 864 may be implemented as one or more of a non-transitory computer-readable medium or media, one or more volatile memory units, or one or more non-volatile memory units. Expansion memory 874 may be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, in an example, expansion memory 874 may include instructions to carry out or supplement the processes described above, and may include secure information. Thus, for example, the expansion memory 874 may be provide as a security module for device 850, and may be programmed with instructions that permit secure use of device 850. Further, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

The device 850 may be configured to communicate wirelessly through communication interface 866, which may include digital signal processing circuitry where necessary. In an implementation, a communication interface 866 may provide for communications under various modes or protocols, such as GSM voice calls, SMS, EMS, or MMS messaging, CDMA, TDMA, PDC, WCDMA, CDMA2000, or GPRS, among others. In an example, such communication may occur, for example, through a radio-frequency transceiver 868. Further, short-range communication may occur, such as using a Bluetooth, WiFi, or other such transceiver (not shown). Still further, a GPS (Global Positioning System) receiver module 870 may provide additional navigation- and/or location-related wireless data to device 850, which may be used as appropriate by applications running on device 850.

The device 850 may be configured to communicate audibly using audio codec 860, which may receive spoken information from a user and convert it to usable digital information. In an example, an audio codec 860 may likewise generate audible sound for a user, such as through a speaker, e.g., in a handset of the device 850. In various implementations, such sound may include sound from voice telephone calls, may include recorded sound (e.g., voice messages, music files, etc.) and may include sound generated by applications operating on the device 850.

The computing device 850 may be implemented in a number of different forms, in a manner as shown in FIG. 8. For example, the computing device 850 may be implemented as a mobile communication device 880 including a cellular telephone and/or some other low power mobile communication devices. In another example, the computing device 850 may be implemented as part of a smart phone 882, personal digital assistant, or some other similar mobile device.

As such, various implementations of the systems, methods, and techniques described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a non-transitory machine-readable medium that is configured to receive machine instructions as a machine-readable signal. In various examples, the term "machine-readable signal" may refer to any signal used to provide machine instructions and/or data to a programmable processor.

In an implementation, to provide for interaction with a user, the systems, methods, and techniques described herein may be implemented on a computer having a display device (e.g., a CRT (cathode ray tube) or LCD (liquid crystal display) monitor or LED (light emitting diode), etc.) for displaying information to the user and a keyboard and a pointing device (e.g., a mouse or a trackball) by which the user may provide input to the computer. Other types of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In various examples, the systems, methods, and techniques as described herein may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems, methods, and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from one another and typically interact through a communication network. The relationship of client and server arises by virtue of computer programs running on the respective computers and having a client-server relationship to one another.

Further, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The above embodiments that have been described in particular detail are merely example or possible embodiments, and that there are many other combinations, additions, or alternatives that may be included.

The particular naming of the components, capitalization of terms, the attributes, data structures, or any other programming or structural aspect is not mandatory or significant, and the mechanisms that may be used to implement aspects of the disclosure or its features may have different names, formats, or protocols. Further, the system may be implemented via a combination of hardware and software, as described, or entirely in hardware elements. Further, any particular division of functionality between the various system components described herein is merely exemplary, and not mandatory; functions performed by a single system component may instead be performed by multiple components, and functions performed by multiple components may instead performed by a single component.

In accordance with aspects of the disclosure, some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Moreover, it has also proven convenient at times, to refer to these arrangements of operations as modules or by functional names, without loss of generality.

Unless specifically stated otherwise as apparent from the above discussion, throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A device comprising:
  an enclosure configured for retaining internal circuitry including at least one processor and at least one memory, the enclosure including:
    an internal frame formed as an array of structural members arranged in a pattern, the internal frame including fibers applied to the pattern of the structural members, including at least one fiber of the fibers interlaced about multiple structural members, and
    an outer shell formed by injecting a material into a mold to thereby encase the internal frame in the material, the material being injected into the mold around the fibers applied to the pattern of the structural members; and
  a user interface coupled to the enclosure, the user interface configured to communicate with the internal circuitry retained by the enclosure.

2. The device of claim 1, wherein:
  the array includes a rectangular array and the pattern includes a grid pattern, and
  the grid pattern of the structural members of the internal frame are formed in a waffle type structure or a lattice type structure with the structural members crossing over each other to form a rectangular pattern.

3. The device of claim 1, wherein the structural members of the internal frame include intersecting cylindrical bodies of material arranged in the pattern.

4. The device of claim 1, wherein the structural members of the internal frame include solid cylindrical bodies of material including at least one of plastic and metal.

5. The device of claim 1, wherein the structural members of the internal frame include hollow tubular bodies of material including at least one of plastic and metal.

6. The device of claim 1, wherein:
  applying the fibers to the structural members of the internal frame includes weaving the fibers into the structural members of the internal frame, and
  the fibers include high-tensile strength fibers that are weaved into the structural members of the internal frame with adjustable spacing.

7. The device of claim 1, wherein:
applying the fibers to the structural members of the internal frame includes winding the fibers around the structural members of the internal frame, and
the fibers include high-tensile strength fibers that are wound around the structural members of the internal frame one or more times.

8. The device of claim 1, wherein each end of the fibers are terminated with a clove hitch.

9. The device of claim 1, wherein the structural members of the internal frame and the fibers are formed with different material.

10. The device of claim 1, wherein the structural members of the internal frame and the fibers are formed with the same material as the injecting material.

11. The device of claim 1, wherein the structural members of the internal frame and the injecting material include at least one of plastic and polymer.

12. The device of claim 1, wherein the fibers include at least one of carbon fibers, Kevlar fibers, plastic fibers, polymer fibers, and steel fibers.

13. The device of claim 1, wherein the outer shell further includes stand-offs to hold the internal frame away from one or more surfaces of the outer shell.

14. The device of claim 1, wherein:
the device includes a portable computing device including at least one of a laptop, a tablet, and a mobile phone, and
the user interface includes at least one of a display, a touch-screen display, a touch sensor, a touch pad, a keyboard, and a trackpad.

15. A method for assembling a computing device, comprising:
forming an enclosure for the computing device, the enclosure configured for retaining internal circuitry including at least one processor and at least one memory, forming the enclosure including:
forming an internal frame of the enclosure as an array of structural members arranged in a pattern,
applying fibers to the internal frame by applying the fibers to the pattern of the structural members, including interlacing at least one fiber of the fibers about multiple structural members to define a composition, and
forming an outer shell of the enclosure by injecting a material into a mold to thereby encase the internal frame in the material, the material being injected into the mold around the fibers applied to the pattern of the structural members; and
coupling a user interface to the enclosure, the user interface configured to communicate with the internal circuitry retained by the enclosure.

16. The method of claim 15, wherein applying the fibers to the internal frame include at least one of weaving the fibers into the structural members of the internal frame and winding the fibers around the structural members of the internal frame one or more times.

17. The method of claim 15, wherein the structural members of the internal frame and the injecting material are formed with at least one of plastic and polymer.

18. The method of claim 15, wherein the fibers include high-tensile strength fibers including at least one of carbon fibers, Kevlar fibers, plastic fibers, polymer fibers, and steel fibers.

19. The method of claim 15, wherein:
the computing device includes a portable computing device including at least one of a laptop, a tablet, and a mobile phone, and
the user interface includes at least one of a display, a touch-screen display, a touch sensor, a touch pad, a keyboard, and a trackpad.

20. An apparatus comprising:
internal circuitry including at least one processor and at least one memory;
an enclosure configured to retain the internal circuitry, the enclosure being fabricated by:
forming an internal frame for the enclosure as an array of intersecting cylindrical structural members arranged in a grid pattern resembling a waffle,
applying high-tensile strength fibers to the internal frame by disposing the high-tensile strength fibers into contact with the structural members, including interlacing at least one fiber of the high-tensile strength fibers about multiple structural members to define a composition, and
forming an outer shell of the enclosure by injecting a plastic material into a mold to thereby encase the internal frame in the plastic material, the plastic material being injected into the mold around the high-tensile strength fibers weaved into and wound around the structural members of the internal frame; and
a user interface coupled to the enclosure, the user interface configured to communicate with the internal circuitry retained by the enclosure.

* * * * *